(12) United States Patent
Hou et al.

(10) Patent No.: US 11,037,084 B2
(45) Date of Patent: Jun. 15, 2021

(54) METHOD AND APPARATUS FOR EVALUATING EXPLOITATION VALUE OF A GEOLOGICAL RESOURCE

(71) Applicant: PetroChina Company Limited, Beijing (CN)

(72) Inventors: Lianhua Hou, Beijing (CN); Caineng Zou, Beijing (CN); Luguang Li, Beijing (CN); Xinhua Ma, Beijing (CN); Jinghong Wang, Beijing (CN); Tao Jiang, Beijing (CN); Wenxue Han, Beijing (CN)

(73) Assignee: PetroChina Company Limited, Beijing (CN)

( * ) Notice: Subject to any disclaimer, the term of this patent is extended or adjusted under 35 U.S.C. 154(b) by 295 days.

(21) Appl. No.: 16/039,823

(22) Filed: Jul. 19, 2018

(65) Prior Publication Data
US 2019/0080273 A1 Mar. 14, 2019

(30) Foreign Application Priority Data
Sep. 8, 2017 (CN) .......................... 201710804295.1

(51) Int. Cl.
*G06Q 10/06* (2012.01)
*G06Q 50/02* (2012.01)

(52) U.S. Cl.
CPC ....... *G06Q 10/06393* (2013.01); *G06Q 50/02* (2013.01); *G06Q 10/06315* (2013.01)

(58) Field of Classification Search
CPC ............ G06Q 10/06393; G06Q 50/02; G06Q 10/06315
See application file for complete search history.

(56) References Cited

U.S. PATENT DOCUMENTS

2008/0172179 A1* 7/2008 Tran ...................... G06Q 10/06
702/6

FOREIGN PATENT DOCUMENTS

| CN | 102865081 | 1/2013 |
| CN | 103901502 | 7/2014 |

(Continued)

OTHER PUBLICATIONS

Search Report (non-English) dated Aug. 23, 2017, from related CN application No. 201710804295.1, 5 pages.

(Continued)

*Primary Examiner* — Saif A Alhija
(74) *Attorney, Agent, or Firm* — Meunier Carlin & Curfman LLC

(57) ABSTRACT

According to some implementations, the present disclosure relates to a method and apparatus for evaluating exploitation value of a geological resource. In one implementation, a method includes: acquiring geological parameters of a geological structure in multiple designated dimensions, wherein the geological parameters are used for characterizing a state of the geological structure in the designated dimensions; matching the geological parameters with a threshold of each of the designated dimensions, respectively, to obtain a characterization value of each of the designated dimensions; forming a characterization vector from the characterization values of the designated dimensions; and performing an evaluation operation based on the characterization vector to obtain an evaluation value of the geological resource in the geological structure. The exploitation value of a geological resource can be evaluated by taking the effect of a threshold of the geological resource on the exploitation value of the geological resource into full consideration.

7 Claims, 12 Drawing Sheets

(56) References Cited

FOREIGN PATENT DOCUMENTS

| | | |
|---|---|---|
| CN | 104573339 | 4/2015 |
| CN | 105443119 | 3/2016 |
| CN | 105488583 | 4/2016 |
| CN | 105697003 | 6/2016 |
| CN | 105888659 A | 8/2016 |
| CN | 106022946 A | 10/2016 |
| CN | 106886058 A | 6/2017 |
| CN | 106991279 A | 7/2017 |
| WO | 99/67660 | 12/1999 |

OTHER PUBLICATIONS

First Office Action and Search Report dated Dec. 24, 2019 issued in Chinese Patent Application No. 201710804295.1.

\* cited by examiner

METHOD AND APPARATUS FOR EVALUATING EXPLOITATION VALUE OF A GEOLOGICAL RESOURCE

CROSS-REFERENCE TO RELATED APPLICATIONS

This application claims priority to Chinese Patent Application No. 201710804295.1, filed on Sep. 8, 2017, which is hereby incorporated by reference in its entirety.

TECHNICAL FIELD

The present disclosure relates to the field of geological resource exploration, and in particular, to a method and apparatus for evaluating exploitation value of a geological resource.

BACKGROUND

Geological resource exploitation includes coal, petroleum, metal and so on, but because cost for geological resource exploitation is high, evaluation on exploitation value of a region is particularly important. In the prior art, some evaluation methods are based on specialists' experiences, and for some evaluation methods, there is no overall consideration of weaknesses of exploitation conditions for geological resources, which all lack of accuracy in evaluation on exploitation value of a geological resource. For example, in an evaluation on trap effectiveness, the evaluation on trap effectiveness is one of evaluations on exploitation value of a geological resource. The trap is a main place where petroleum are accumulated and stored, and is also a main object for petroleum exploration and research, while the trap target to be drilled in petroleum exploration is an effective trap. The effective trap is a trap from which industrial petroleum flow can be obtained. At present, existing evaluation technologies for petroleum traps mainly include: an evaluation technology based on trap recognition and description, which places emphasis on recognition and description of trap form; a trap evaluation technology based on specialists' knowledge, which performs a qualitative comprehensive evaluation on the trap mainly depending on human experience; an evaluation technology based on giving weights to geological parameters of the trap, which performs a semi-quantitative evaluation on given weights to the trap parameters mainly depending on humans; an evaluation technology for the amount of potential resources of a trap, which performs queuing optimization and evaluation on the trap mainly according to the amount of potential resources of the trap; an analogy method with known reservoirs including trap evaluation technologies such as a multidimensional decision-making method, artificial neural network, Monte Carlo, an optimal linear theory and the like, which determines drill ability mainly based on the comparison between the evaluated parameters of the trap and the known reservoirs. Thus, in conventional approaches, a human can play a large role in the evaluation on trap effectiveness, and thus an especially objective and accurate evaluation may not be able to be obtained.

Among other needs, there is a need for a method for evaluating exploitation value of a geological resource to obtain a better evaluation value.

SUMMARY

In some aspects, the present application provides a method, an apparatus, an electronic device and a computer storage medium for evaluating exploitation value of a geological resource, which can evaluate effectiveness of the trap.

Some implementations according to the present application provide a method for evaluating exploitation value of a geological resource. In some implementations, the method comprises: acquiring geological parameters of a geological structure in multiple designated dimensions, wherein the geological parameters are used for characterizing a state of the geological structure in the designated dimensions; matching the geological parameters with a threshold of each of the designated dimensions, respectively, to obtain a characterization value of each of the designated dimensions; forming a characterization vector by characterization values of the designated dimensions, wherein the threshold is used for representing a minimum value of the geological parameters in the designated dimensions corresponding to a valuable geological resources, a geological resource corresponding to the minimum value of the geological parameters belongs to the same sort as the geological resource and has been exploited; and performing an evaluation operation based on the characterization vector to obtain an evaluation value of the geological resource in the geological structure.

Other implementations of the present application provide an apparatus for evaluating exploitation value of a geological resource. In some implementations, the apparatus comprises: an acquisition unit for acquiring geological parameters of a geological structure in multiple designated dimensions, wherein the geological parameters are used for characterizing a state of the geological structure in the designated dimensions; a matching unit for matching the geological parameters with a threshold of each of the designated dimensions, respectively, to obtain a characterization value of each of the designated dimensions, and forming a characterization vector by characterization values of the designated dimensions, wherein the threshold is used for representing a minimum value of the geological parameters in the designated dimensions corresponding to a valuable geological resource, a geological resource corresponding to the minimum value of the geological parameters belongs to the same sort as the geological resource and has been exploited; and an evaluation unit for performing an evaluation operation based on the characterization vector to obtain an evaluation value of the geological resource in the geological structure.

Other implementations of the present application provide an electronic device that comprises an input device and a processor. The input device is used for acquiring geological parameters of a geological structure in multiple designated dimensions, wherein the geological parameters are used for characterizing a state of the geological structure in the designated dimensions. The processor is used for matching the geological parameters with a threshold of each of the designated dimensions, respectively, to obtain a characterization value of each of the designated dimensions, forming a characterization vector by characterization values of the designated dimensions, wherein the threshold is used for representing a minimum value of the geological parameters in the designated dimensions corresponding to a valuable geological resource belonging to the same sort as the geological resource and having been exploited. The processor is also used for performing an evaluation operation based on the characterization vector to obtain an evaluation value of the geological resource in the geological structure.

Other implementations according to the present application as disclosed in the present specification provide a computer storage medium storing computer program instructions which, when executed by a processor, cause a computer to perform functions that include: acquiring geological parameters of a geological structure in multiple designated dimensions, wherein the geological parameters are used for characterizing a state of the geological structure in the designated dimensions; matching the geological parameters with a threshold of each of the designated dimensions, respectively, to obtain a characterization value of each of the designated dimensions; forming a characterization vector by characterization values of the designated dimensions, wherein the threshold is used for representing a minimum value of the geological parameters in the designated dimensions corresponding to a valuable geological resource, a geological resource corresponding to the minimum value of the geological parameters belongs to the same sort as the geological resource and has been exploited; and performing an evaluation operation based on the characterization vector to obtain an evaluation value of the geological resource in the geological structure.

It can be seen from some of the above described technical solutions, some implementations of the present application can: realize quantitative evaluation on exploitation value of a geological resource by acquiring geological parameters of a geological structure in multiple designated dimensions; match the geological parameters with a threshold of each of the designated dimensions, respectively, to obtain a characterization value of each of the designated dimensions; form a characterization vector by characterization values of the designated dimensions; and perform an evaluation operation based on the characterization vector to obtain an evaluation value of the geological resource in the geological structure, which takes into consideration multiple dimensions, especially, geological parameters in multiple dimensions and the corresponding threshold for representing a minimum value of the geological parameters in the designated dimensions corresponding to an exploited valuable geological resource belonging to the same sort as the geological resource.

BRIEF DESCRIPTION OF DRAWINGS

In order to describe some technical solutions and implementations of the present application, accompanying drawings are provided, which are briefly described below.

DETAILED DESCRIPTION

Various example implementations of the present application will be described as follows with reference to the accompanying drawings. The described implementations are merely some example implementations and do not include all possible implementations.

Figure 1:
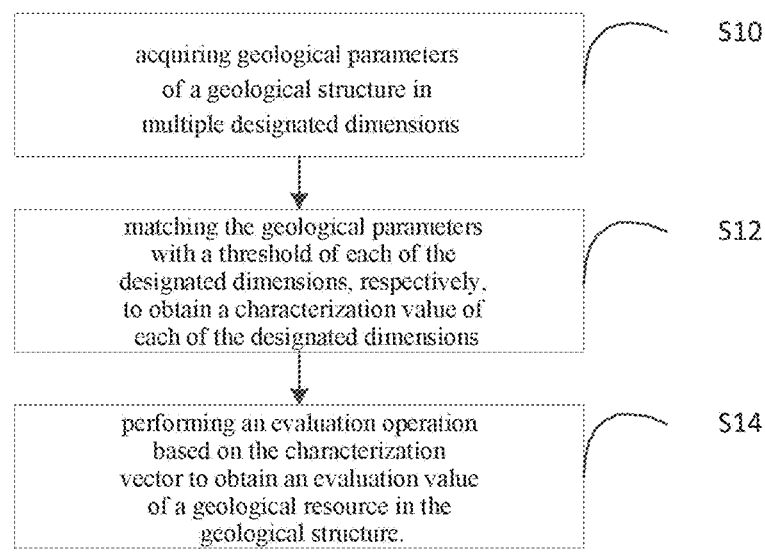
FIG. 1 is a flowchart of a method for evaluating exploitation value of a geological resource according to one implementation of the present application.

FIG. 1 is a flowchart of a method for evaluating exploitation value of a geological resource, according to one implementation of the present application. The evaluation method may include the following steps.

In one implementation, an object which executes evaluation on exploitation value of a geological resource may be an electronic device with logic operation functions. The electronic device may be a server and a client. The client may be a desktop computer, a tablet computer, a notebook computer, a work station and the like. Of course, the client is not limited to the above electronic devices with certain entities, it may also be a software operating in the above electronic devices, and may also be a program software formed by program development, and the program software can be operated in the above electronic devices.

In some implementations, the geological resource includes coal, oil, gas, geothermy, metallic minerals (such as iron, manganese, copper), nonmetallic minerals, and the like. The geological resource is in the geological structure. Specifically, for example, evaluation on exploitation value of geological resources of petroleum, i.e., evaluation on trap effectiveness, and other evaluations on exploitation value of a geological resource using this method also belong to the protection scope of the present application.

In some implementation, an effective trap is a trap which accumulates petroleum and forms a petroleum reservoir having industrial value, and the quantitative evaluation on trap effectiveness is to evaluate whether the trap has industrial value or not. There are many controlling factors for an effective trap, and an evaluation coincidence rate can be improved when all of the factors controlling the trap to be formed to have industrial value are taken into consideration.

Still referring to FIG. 1, Step S10 corresponds to the following: acquiring geological parameters of the geological structure in multiple designated dimensions, wherein the geological parameters are used for characterizing a state of the geological structure in the designated dimensions.

The geological structure may refer to morphological characteristics owned by a geologic body (such as a sedimentary rock body, an intrusive rock body or an ore body, etc.) itself, and specifically, may refer to a geology condition which can store or migrate geological resources, including structures and geological settings. In a specific implementation, the geological structure is a trap, and it is necessary to evaluate the exploitation value of petroleum in the region, namely, to evaluate effectiveness of the trap.

The multiple designated dimensions may be dimensions related to categories of the geological resources. For example, when evaluating coal mine resources, the dimensions may include a plurality of dimension parameters such as dip angle of coal seam, thickness of coal seam, coal seam range, depth of coal seam and the like. When evaluating petroleum resources, the dimensions may include porosity, trap area, cap-rock thickness, effective reservoir thickness, a passage system, and distance to a hydrocarbon generation center.

Geological parameters may refer to parameters related to exploitation value of a geological resource in the geological structure; the geological parameters are used for characterizing state of the geological structure in the designated dimensions, and refer to parameter values of the geological structure in the dimensions. For example, in a setting in which effectiveness of a trap is evaluated, the geological parameters refer to the state in the dimension, including trap parameters such as porosity, trap area, cap-rock thickness, effective reservoir thickness, a passage system, and distance to a hydrocarbon generation center; the trap parameters are expressions of the geological parameters in evaluation of the trap.

The geological parameters of the geological structure in the multiple designated dimensions may be acquired by the input of an input device that may be a keyboard, a mouse, a voice input device or the like; or the geological parameters may be acquired by the input of an external storage device that may be a U disk, a mechanical hard disk or the like; or the geological parameters may be received through a network, such as Internet, LAN (local area network); or the geological parameters may be acquired by reading local data, and the like.

Step S12 corresponds to matching the geological parameters with a threshold of each of the designated dimensions, respectively, to obtain a characterization value of each of the designated dimensions; and forming a characterization vector by the characterization values of the multiple designated dimensions, wherein the threshold is used for a minimum value of the geological parameters in the designated dimensions corresponding to an exploited valuable geological resource belonging to the same sort as the geological resource.

The characterization value refers to the contribution value of the geological parameters to the exploitation value of a geological resource in each dimension. Specifically, in an implementation of evaluating effectiveness of a trap, the characterization value refers to the contribution value of the trap parameters on forming an industrial petroleum reservoir in each dimension, which is used to evaluate the dimension, and embodies the effect of the threshold in the dimension and the effect of the geological parameters.

The threshold refers to a threshold of controlling factor parameters having exploitation value of the geological resource, and the threshold is used to represent the minimum value of the geological parameters in the designated dimension corresponding to the exploited valuable geological resource belonging to the same sort as the geological resource. Specifically, in an implementation of evaluating the trap effectiveness, the threshold refers to a threshold of controlling factor parameters of a trap having industrial value. When the value of a certain trap parameter of the evaluated trap is lower than a corresponding threshold, the trap cannot obtain industrial petroleum flow, and only when all of the controlling factor parameters of the trap are higher than the corresponding threshold, the trap is an effective trap. Specifically, the threshold can include thresholds of porosity, trap area, cap-rock thickness, effective reservoir thickness a passage system, and distance to a hydrocarbon generation center corresponding to the trap parameters. Accordingly, such implementations of the present application overcome a conventional problem of inadequate consideration of the threshold by considering at least the six thresholds.

The characterization values in the multiple designated dimensions form a characterization vector; the characterization vector is a carrier of the characterization values, and also is a set of the characterization values, for preparation to obtain the evaluation value of geological resource exploitation. The characterization values in the characterization vector have the same weight.

Matching the geological parameters with the threshold of each of the designated dimensions, respectively, includes: unifying data in different dimensions into non-dimensional parameters through the characterization values. The characterization values corresponding to different dimensions have the same weight, and it is convenient for performing overall operation to obtain the evaluation value of a trap after the data being normalized and quantified.

Step S14 corresponds to performing an evaluation operation based on the characterization vector to obtain an evaluation value of the geological resource in the geological structure.

The evaluation value of exploitation value of a geological resource is used for evaluating the exploitation value of a geological resource, and includes a first feature including that the geological resource has exploitation value in the case that the evaluation value of exploitation value of the geological resource is within the designated range. In this implementation, the evaluation value of a trap refers to a numerical value reflecting the effective probability of the trap.

In this implementation, performing an evaluation operation based on the characterization vector refers to calculating characterization values having the same weight in the characterization vector to obtain an evaluation value of the geological resource in the geological structure. The calculation method may include, but is not limited to, algorithms such as arithmetic mean, geometric mean, harmonic mean, weighted mean and so on.

The multiple dimensions may include porosity, trap area, cap-rock thickness, effective reservoir thickness, a passage system, and distance to a hydrocarbon generation center. The multiple designated dimensions are related to the trap effectiveness; some implementations overcome the defect of insufficient consideration of dimensions of the effective trap by taking at least the six dimensions into consideration.

The trap is a place which can stop continuous migration of oil and gas and the oil and gas can be gathered therein. The trap parameter of trap area represents coverage area of the trap. The threshold of trap area refers to the minimum trap area having industrial petroleum reservoir formed therein.

Figure 2:
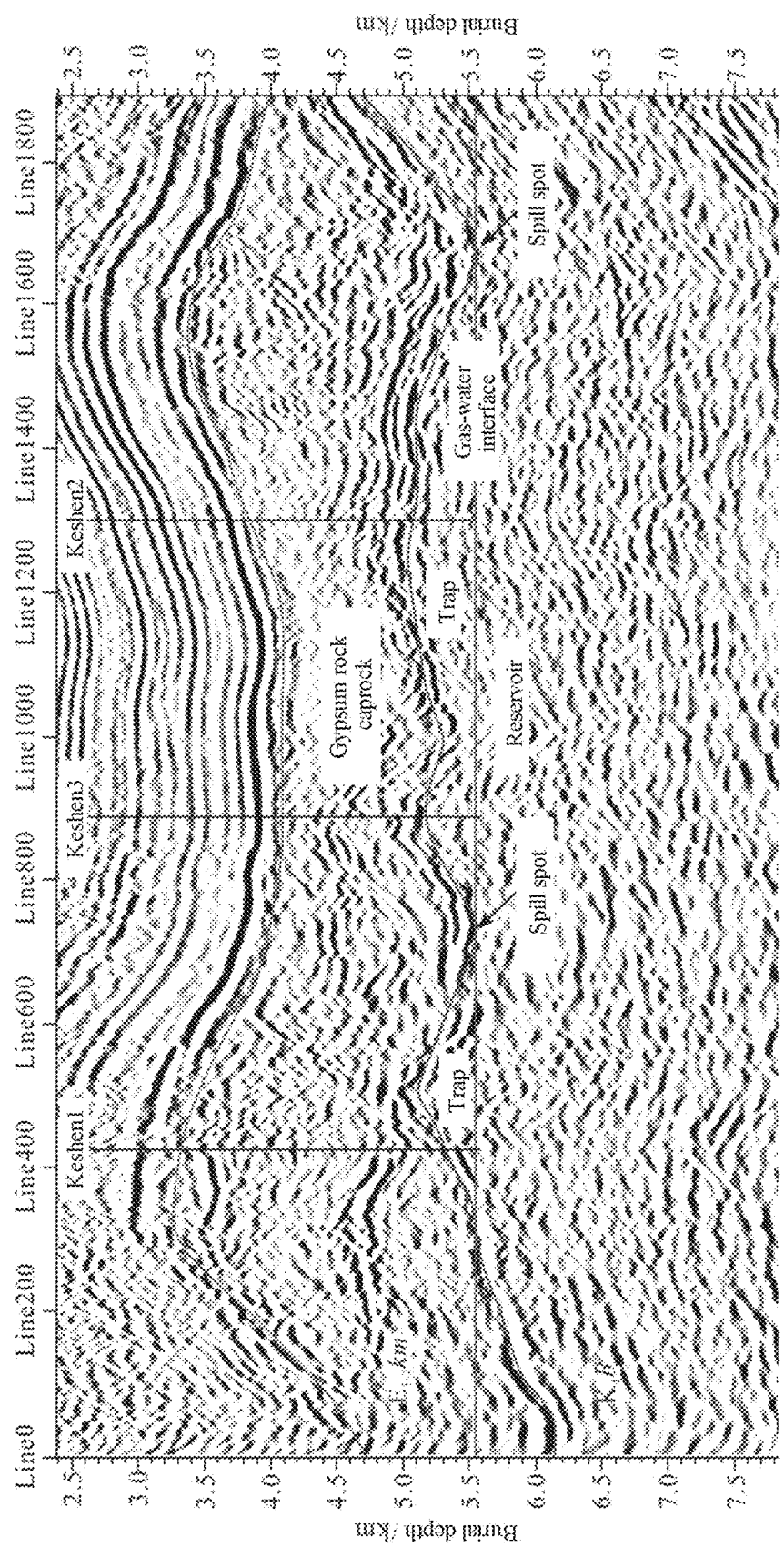
FIG. 2 is a characteristic diagram of seismic profiles of a trap and an overlying gypsum-salt rock cap-rock distribution according to one implementation of the present application.
Figure 3:
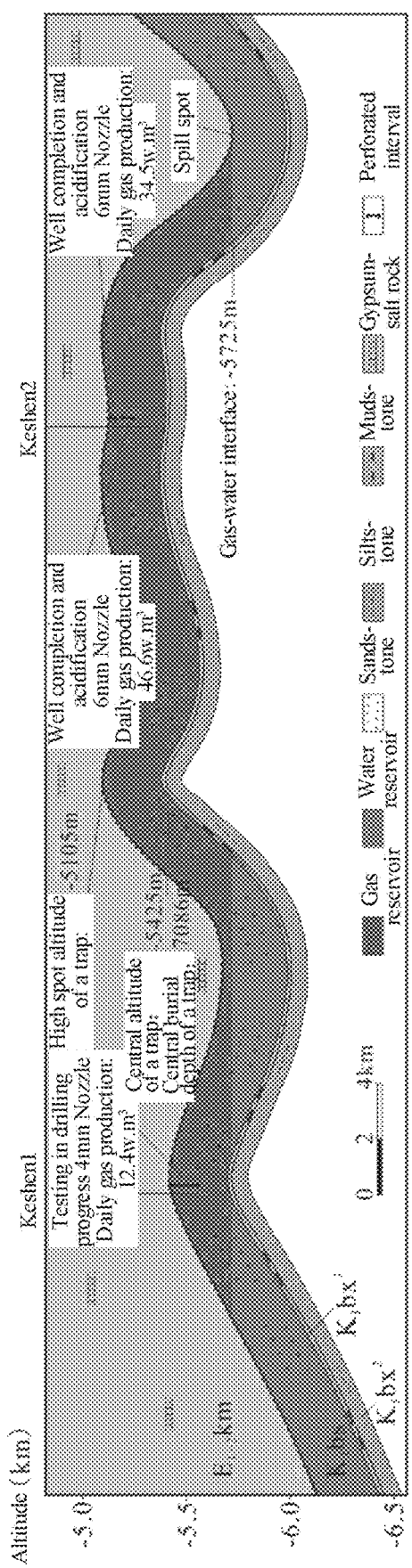
FIG. 3 is a characteristic diagram of a trap according to one implementation of the present application.
Figure 4:
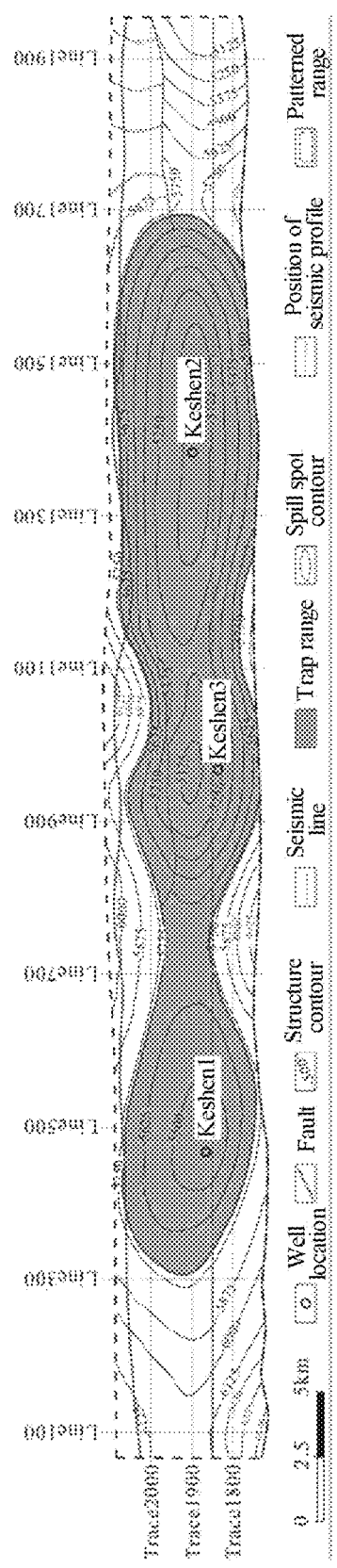
FIG. 4 is a contour map of a trap provided according to one implementation of the present application.

In this implementation, the trap parameters of a trap area is acquired, through the collection of logging and seismic data of the research region and the target horizon and through logging demarcation, the developed horizons of the reservoir are determined, and then the seismic interpretation and patterning are performed to determine trap parameters such as trap area, closure height and spill point and the like. Referring to FIG. 2, FIG. 3 and FIG. 4, in a specific implementation, the spill point of the trap in the geological structure has an altitude of −5725 m, the high spot of the trap has an altitude of −5105 m, the closure height of the trap is 620 m, the region demarcated in the trap range is the trap area in FIG. 4, the trap area in this implementation is obtained as 62.4 km².

The cap-rock is a protective layer that is above a reservoir and can seal the reservoir so as to avoid fluids therein from dissipating upward. The trap parameter of cap-rock thickness is the thickness of a overburden that seals the trap to be totally filled with natural gas; the threshold of cap-rock thickness refers to the minimum thickness which the cap-rock can seal the trap to be totally filled with natural gas, and the condition for sealing the overburden of the trap is effective.

Logging data and core physical property analysis data of the research region and the target horizon can be collected, logging data is demarcated through the core physical property analysis data, and the effective reservoir thickness in which the porosity is larger than the porosity threshold of 3.5% of reservoir stratums forming a gas reservoir having industrial value is determined through logging interpretation. In a specific implementation, the average value of effective reservoir thickness of the trap in the geological structure is obtained as 94.2 m.

Figure 5:
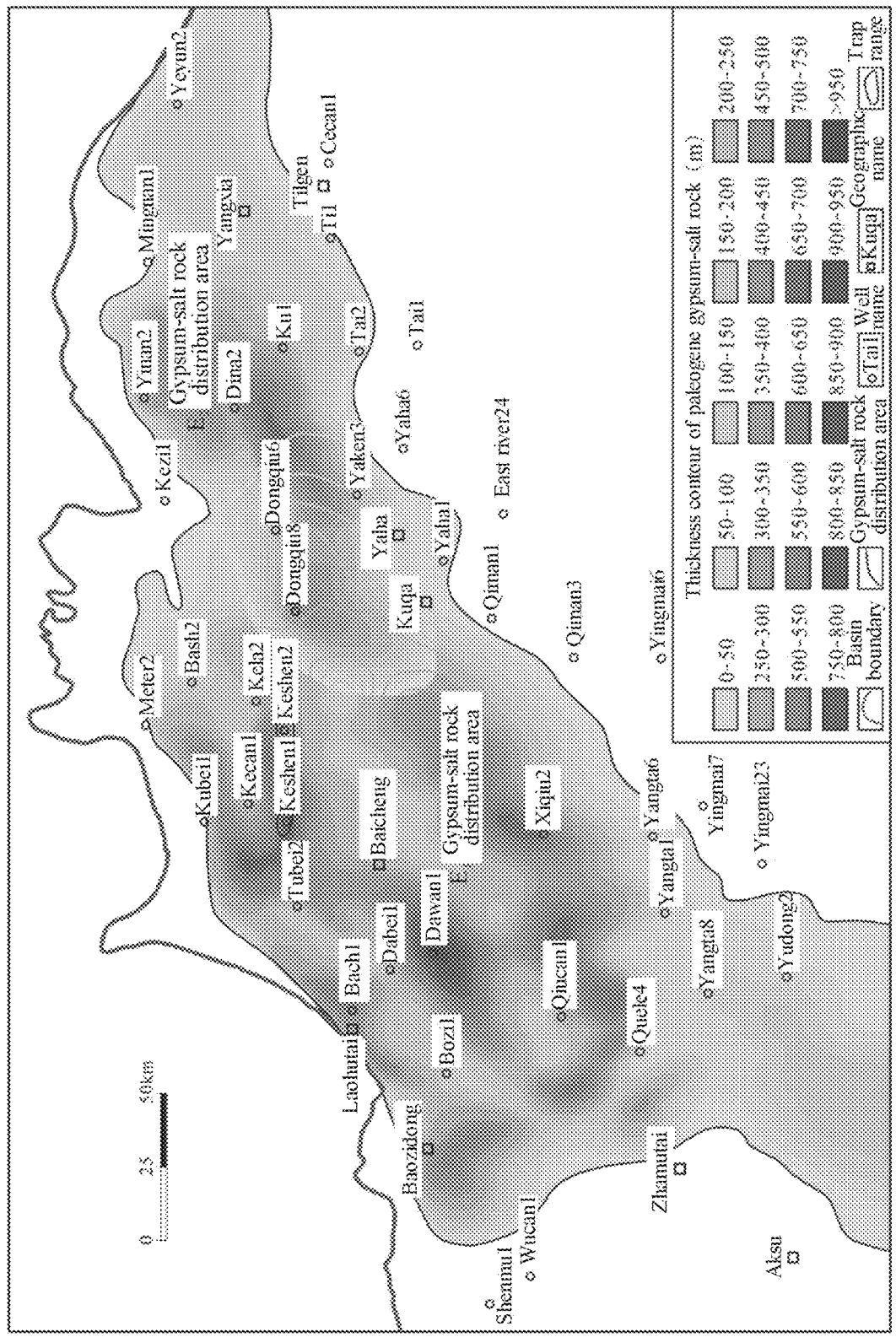
FIG. 5 is a characteristic diagram of thickness distribution of a gypsum-salt cap-rock of a trap according to one implementation of the present application.

In this implementation, the trap parameter of cap-rock thickness is determined, and the top and bottom interfaces of the overburden of the trap is determined by collecting logging and seismic data of the target horizon and logging demarcation. Referring to FIG. 2, the thickness of the overburden of the trap is determined through seismic interpretation. Referring to FIG. 5, in a specific implementation, the region of the geological structure is Keshen 1 to Keshen 2, and the thickness of the overburden of the trap is larger than 400 m.

The ratio of pore volume of the porosity rock to the total volume of the rock reflects the capability of accumulating fluids by the strata. The porosity threshold refers to the minimum porosity for forming a reservoir having industrial gas flow. The passage system refers to all path networks passed by petroleum in the process of being migrated from hydrocarbon source rocks to the trap and related surrounding rocks, including connected sand bodies, fault, unconformity and combination thereof. The trap parameter of distance to a hydrocarbon generation center refers to a parameter reflecting the relationship between the position of the evaluated trap and the migration range of petroleum. The effective trap can be formed more easily as the position of the evaluated trap is closer to the effective hydrocarbon generation range. The threshold of distance to a hydrocarbon generation center refers to a parameter value of the trap parameter of distance to a hydrocarbon generation center when the trap is at the farthest boundary position for petroleum migration.

In one implementation, obtaining data of the passage system and dimensional data of the distance to a hydrocarbon generation center may include the following steps.

Step S20 corresponds to obtaining an effective hydrocarbon generation range of a target stratum. In this implementation, the effective hydrocarbon generation range is a region range in which a gas reservoir having industrial value can be formed.

Total organic carbon (TOC) in hydrocarbon source rock core analysis and analysis data of vitrinite reflectance (Ro) in the same petroleum system of the research region and the target horizon are collected, specifically, natural gas of the trap in the geological structure is determined as coming from Jurassic system and Triassic system by measuring the total organic carbon in sedimentary rocks (GB/T 19145-2003) and the method for measuring vitrinite reflectance in sedimentary rocks (SY/T 5124-2012). The logging data and seismic data of the research region and the target horizon are collected, thickness of the hydrocarbon source rock is determined by seismic interpretation, and TOC distribution is determined by logging interpretation.

Figure 6:
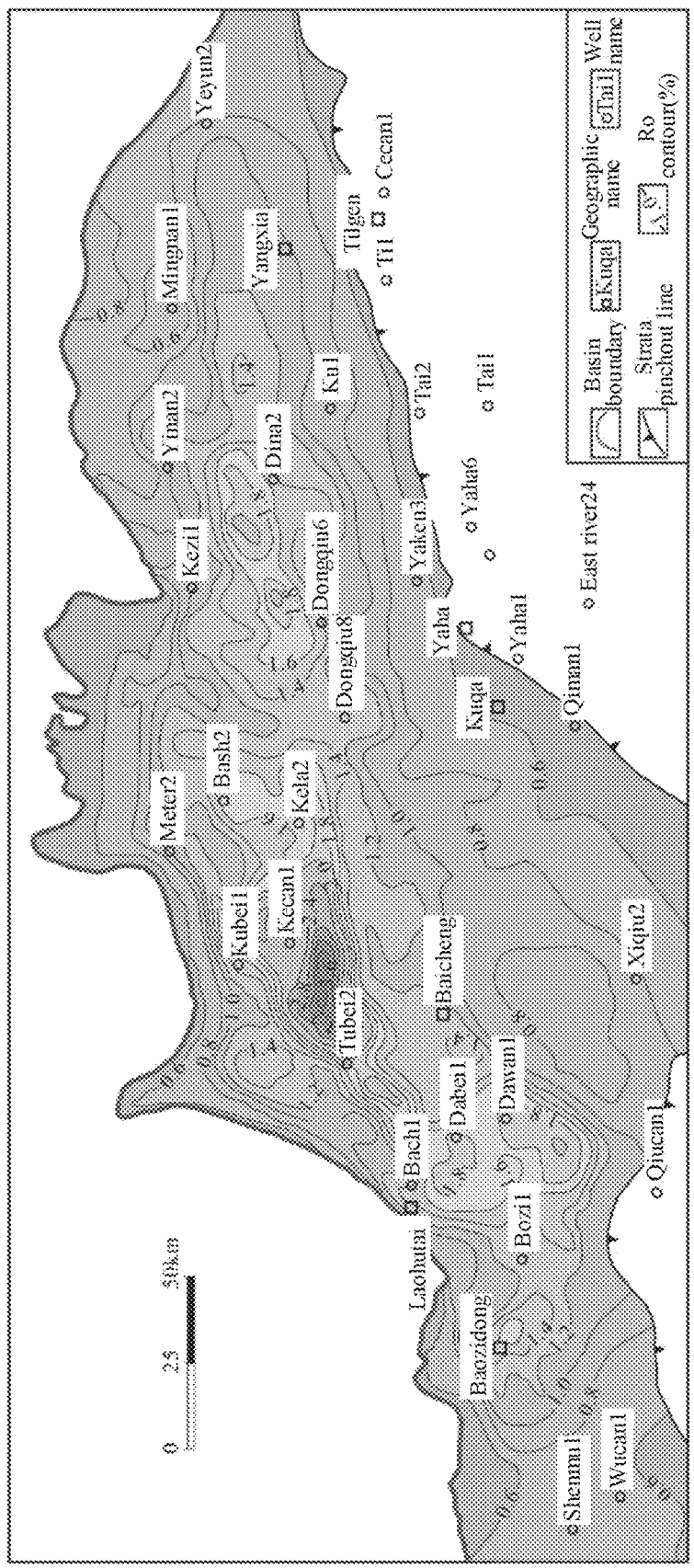
FIG. 6 is a characteristic diagram of reflectivity Ro distribution of a hydrocarbon source rock core vitrinite according to one implementation of the present application.
Figure 7:
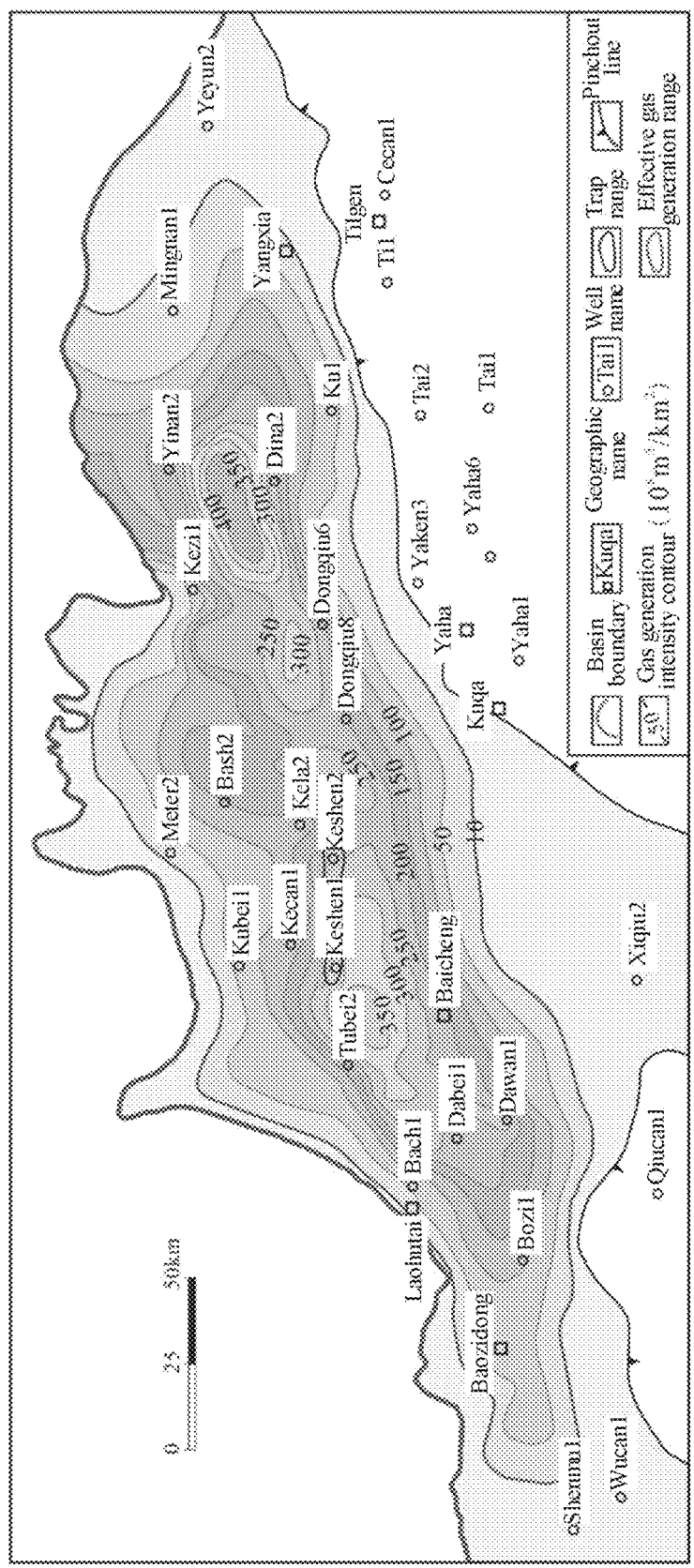
FIG. 7 is a characteristic diagram of gas generation abundance distribution of a hydrocarbon source rock according to one implementation of the present application.

Referring to FIGS. 6 and 7, Ro distribution and gas generation intensity distribution are determined by basin simulation. With the increase of TOC and Ro, gas generation intensity will increase. According to gas generation intensity data of 272 developed gas fields and regions collected from basins containing petroleum where industrial petroleum reservoirs have been discovered, when the gas generation intensity is higher than $10 \times 10^8$ m³/km², a gas reservoir having industrial value can be formed, so as to determine the effective hydrocarbon generation range when the gas generation intensity is higher than $10 \times 10^8$ m³/km².

Figure 8:
FIG. 8 is a characteristic diagram of a fault for communicating a trap and a hydrocarbon source rock according to one implementation of the present application.

Step S22 corresponds to obtaining data of the passage system. Contribution of the passage system to petroleum reservoirs of the trap in certain implementations is determined by using the following methods: it is 0.1 when there is no effective passage system, thus the threshold of the passage system is 0.1, and it is 0.5 when the combination of fault or sand body or unconformity is an indirect passage system, and it is 0.55 when the sand body is a direct passage system, and it is 0.6 when the unconformity is a passage system, and it is 0.8 when the hydrocarbon source rock and a trap reservoir directly contact to form a passage system, and it is 0.9 when the fault is a direct passage system. Referring to FIG. 8, in a specific implementation, the trap fault is a direct passage system, and the threshold of the passage system is 0.9.

Step S24 corresponds to obtaining data of the distance to a hydrocarbon generation center. In one implementation, the distance parameter is 0.9 when the evaluated trap is within the effective hydrocarbon generation range, the distance parameter is 0.1 when the evaluated trap is within the boundary of the farthest petroleum migration range, and the distance parameter is 0 when the evaluated trap is outside of the boundary of the farthest petroleum migration range. Specifically, data of traps corresponding to the discovered petroleum reservoirs, effective hydrocarbon generation range, and the farthest boundary position for petroleum migration are collected, a parameter of petroleum migration distance from the trap to the boundary of an effective hydrocarbon generation center is acquired. When the evaluated trap is located between the effective hydrocarbon generation range and the boundary of the petroleum migration range, the parameter of distance from the evaluated trap to the hydrocarbon generation center is obtained according to the following function:

$$L = 0.1 + 0.8 \times \frac{L_{max} - L_S}{L_{max}}$$

where L is a petroleum migration distance parameter of the evaluated trap, in the unit of km, $L_S$ is distance from the evaluated trap to the boundary of an effective hydrocarbon generation range, in the unit of km, $L_{max}$ is distance from the boundary of the effective hydrocarbon generation center to the boundary of the farthest petroleum migration range, in the unit of km. The outer boundary of the effective passage system of the hydrocarbon source rock of a target stratum is the boundary of the farthest petroleum migration range. In a specific implementation, the position of the evaluated trap may be the geometric center of the trap area. When the trap is within the range of the effective hydrocarbon generation center, the trap parameter of distance to the hydrocarbon generation center is 0.9. Particular details are shown and included in Table 1 below.

TABLE 1 parameters related to evaluation on a certain trap

| name of parameter | threshold | trap parameter |
|---|---|---|
| trap area (km²) | 5 | 62.4 |
| cap-rock thickness (m) | 0.45 | 400 |
| porosity (%) | 3.5 | 6.6 |
| effective reservoir thickness (m) | 10 | 94.2 |
| passage system | 0.1 | 0.9 |
| distance to a hydrocarbon generation center | 0.1 | 0.9 |

In one implementation, the threshold of trap area is 5 km², the threshold of cap-rock thickness is 0.45 m, the threshold of porosity is 3.5%, the threshold of effective reservoir thickness is 10 m, the threshold of the passage system is 0.1, and the threshold of the distance to the hydrocarbon generation center is 0.1. The thresholds can be applied to other evaluated traps and have commonality.

Figure 9:
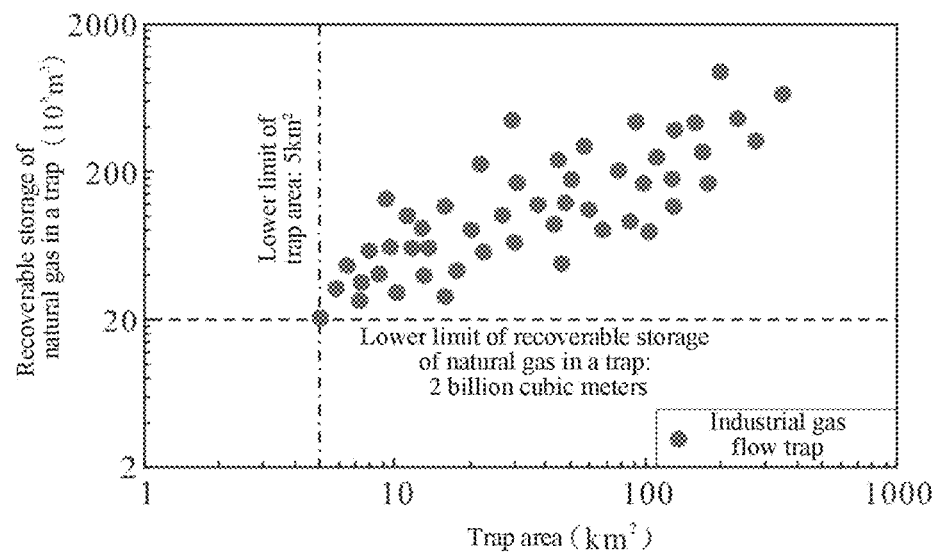
FIG. 9 is a characteristic diagram of an area threshold (lower limit) of an effective trap of natural gas according to one implementation of the present application.

Referring to FIG. 9, in one implementation the threshold of trap area is acquired by collecting 360 trap gas fields that have been discovered and effectively exploited, the acquired minimum trap area is 5 km², and additionally 49 trap gas fields are selected randomly therefrom, when the recoverable reserves of natural gas in a single trap are larger than 20×10⁸ m³, the single trap is an effective trap, the acquired threshold of trap area is 5 km². Accordingly, the threshold of trap area of the research region where a gas reservoir having industrial value is formed is 5 km², and at this time, the height of gas column of the research region (i.e., the closure height of the trap) is 32 m.

Acquiring the threshold of cap-rock thickness may include the following steps.

Step S30 corresponds to acquiring the effective cap-rock thickness for sealing natural gas can be according to the following function.

$$H_s = (g \times H_{ts}(\rho_w - \rho_{gsc}/B_{gi})/145)/T_s$$

where $H_s$ is the effective cap-rock thickness, in the unit of m; $H_{ts}$ is the closure height of the trap, in the unit of m; $\rho_w$ is water density in stratum condition, in the unit of g/cm³; $\rho_{gsc}$ is natural gas density in ground condition, in the unit of g/cm³; $B_{gi}$ is a volume coefficient of natural gas; $T_s$ is a gradient value difference of breakthrough pressure of gypsum-salt rocks, in the unit of MPa/m; and g is an acceleration of gravity, in the unit of m/s².

In a specific implementation, the closure height of the trap is 620 and the overburden of the trap is a gypsum-salt rock. Three (3) core samples of the gypsum-salt rock of the overburden of the evaluated trap are collected, and a breakthrough pressure experiment for simulating temperature and pressure conditions of strata is conducted. Specifically, the gradient value difference of breakthrough pressure can be measured by a method for measuring breakthrough pressure of rock gas (SY/T 5748-2013). The gradient value differences of breakthrough pressure of 3 samples are 3.5 MPa/m, 3.8 MPa/m and 4.2 MPa/m, respectively. For conservative reasons, the minimum gradient value difference of breakthrough pressure of 3.5 MPa/m is used as the gradient value difference of breakthrough pressure of the overburden of the trap.

Ground temperature of the evaluated trap is calculated by using the central burial depth of the trap, high spot of the trap has an altitude of −5105 m, the thickness of a stratum above the sea level is 1671 m, and the central burial depth of the trap is calculated as 7086 m, a geothermal gradient value of an area where the evaluated trap locates is 2.188° C./100 m, average temperature of ground surface is 18° C., and an average stratum temperature is calculated as 446 K; a central stratum pressure of the trap employs a pressure gradient value of 1.655 MPa/100 m of the Kela 205 well of the discovered gas reservoir of an adjacent region, the central burial pressure of the evaluated trap is calculated as 117.30 MPa. Natural gas samples in the same stratum in the vicinity of the evaluated trap are collected, a deviation coefficient of natural gas of 1.718 is obtained by a PVT (Pressure-Volume-Temperature) experiment. Specifically, the deviation coefficient of natural gas is obtained by measuring in accordance with the calculation standard of compressibility factor of natural gas (GB/T 17747.1-2011, GB/T 17747.2-2011, and GB/T 17747.3-2011). The ground standard temperature is 291 K. and the ground standard pressure is 0.101 MPa. The volume coefficient of natural gas is calculated according to the following function.

$$B_{gi} = \frac{P_{sc} \times T \times Z_i}{T_{sc} \times P_i}$$

where $B_{gi}$ is the volume coefficient of natural gas and is dimensionless; $P_{sc}$ is the ground standard pressure, in the unit of MPa; $T_{sc}$ is the ground standard temperature, in the unit of K; $Z_i$ is the deviation coefficient of natural gas and is dimensionless; and $P_i$ is the central pressure of the trap, in the unit of MPa. The volume coefficient of natural gas is obtained as 0.00223 by using the above function. Stratum water of the evaluated trap is collected, under the temperature and pressure conditions of the central depth of the trap, the density of stratum water is 1.067 g/cm³. Natural gas samples in the same region and the same horizon of the evaluated trap are collected, and the density of natural gas under the ground condition is measured as 0.000768 g/cm³ by an experiment. The above data can also be acquired by collecting petroleum analysis data and breakthrough pressure experiment data of the evaluated trap or the research region.

The above parameters are substituted into the function $H_s = (g \times H_{ts}(\rho_w - \rho_{gsc}/B_{gi})/145)/T_s$, to obtain the thickness of the effective gypsum-salt rock when the trap is totally filled with natural gas, which is 8.66 m, that is, the thickness of an effective cap-rock in the implementation is 8.66 m. When the cap-rock thickness of a gypsum-salt rock is larger than 8.66 m, the cap-rock can seal the trap to be totally filled with natural gas; when the thickness of the overlying gypsum-salt rock of the evaluated trap is larger than 400 m, the sealing condition for the overlying cap-rock of the trap is effective.

Step S32 corresponds to acquiring the threshold of cap-rock thickness in the research region according to an analogy principle.

Specifically, in an implementation according to step S30, the closure height of the trap is 620 m, the thickness of corresponding effective gypsum-salt rock is 8.66 m, the height of gas column in the trap is 32 m, which is corresponding to the area threshold of a trap formed in the research region of 5 km², that is, the closure height of the trap is 32 m. Accordingly, the threshold of cap-rock thickness of a gypsum-salt rock is 0.45 m, which is corresponding to the height of gas column of 32 m for effectively sealing, that is, the threshold of cap-rock thickness of the gypsum-salt rock of the trap formed with the gas reservoir having industrial value is 0.45 m.

In another example implementation, the threshold of cap-rock thickness may also be obtained by directly measuring samples of the research region. The specific process is the same as that in the step S30, the research object is directly the research region, here only brief description is made without detailed statements. The obtained threshold of cap-rock thickness is slightly different from the threshold of cap-rock thickness in the research region obtained by adopting the analogy principle. Specifically, the obtained threshold of cap-rock thickness may be a result acquired by taking the research region as an object, or may be a result acquired by adopting the analogy principle, or may be an average value of the both.

Specifically, taking the research region as an object, the threshold of cap-rock thickness for sealing natural gas is acquired according to the following function.

$$H_s = (g \times H_{ts}(\rho_w - \rho_{gsc}/B_{gi})/145)/T_s$$

where $H_s$ is an effective cap-rock thickness, in the unit of m; $H_{ts}$ is a closure height of a trap in the research region, in the unit of m; $\rho_w$ is water density in stratum condition, in the unit of g/cm³; $\rho_{gsc}$ is natural gas density in ground condition, in the unit of g/cm³; $B_{gi}$ is a volume coefficient of natural gas; $T_s$ is a gradient value difference in breakthrough pressure of a gypsum-salt rock, in the unit of MPa/m and g is an acceleration of gravity, in the unit of m/s².

The gradient value difference in breakthrough pressure of a gypsum-salt rock is obtained by a breakthrough pressure experiment for simulating stratum temperature and pressure conditions; a deviation coefficient of natural gas is obtained through an experiment on the collected natural gas sample, and the volume coefficient of natural gas is calculated according to the following function.

$$B_{gi} = \frac{P_{sc} \times T \times Z_i}{T_{sc} \times P_i}$$

where $B_{gi}$ is the volume coefficient of natural gas and is dimensionless; $P_{sc}$ is the ground standard pressure, in the unit of MPa; $T_{sc}$ is the ground standard temperature, in the unit of K; $Z_t$ is the deviation coefficient of natural gas and is dimensionless; $P_i$ is the central pressure of the trap, in the unit of MPa.

The density of stratum water is obtained by collecting stratum water of the trap in the research region; and the density of natural gas is obtained by collecting natural gas samples in the same region and the same horizon of the trap in the research region. The above data is substituted into $H_s = (g \times H_{ts}(\rho_w - \rho_{gsc}/B_{gi})/145)/T_s$, to obtain the effective cap-rock thickness of the research region, i.e., the threshold of cap-rock thickness.

Figure 10:
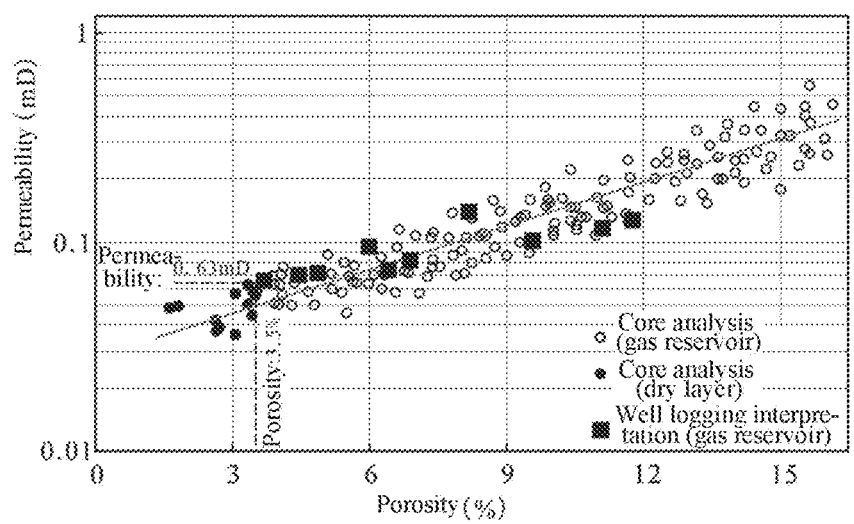
FIG. 10 is a characteristic diagram of a porosity threshold (lower limit) of a reservoir in an industrial gas flow interval according to one implementation of the present application.

In this implementation, core physical analysis data, gas testing data and logging data of a neighboring region and the same target stratum of the research region are collected, core analysis porosity is demarcated, and the threshold porosity of an reservoir in industrial gas flow interval is obtained as 3.5% through logging data interpretation, referring to FIG. 10. Core analysis porosity data and logging data of gas reservoirs in the target stratum are collected, core analysis porosity demarcates logging, and an average reservoir porosity of reservoir porosities of the evaluated trap larger than the porosity threshold of 3.5% is obtained as 6.6% through logging data interpretation, such as logging interpretation (gas reservoir) as shown in FIG. 10. If there is not this data, the average reservoir porosity of reservoir porosities of the evaluated trap larger than the porosity threshold may also be obtained by collecting a reservoir core sample of a target interval of the evaluated trap and measuring the porosity of the sample in accordance with rock porosity and permeability measurement method under the overburden pressure (SY/T 6385-1999), and this average reservoir porosity may also be obtained by adopting a method of weighting.

Figure 11:
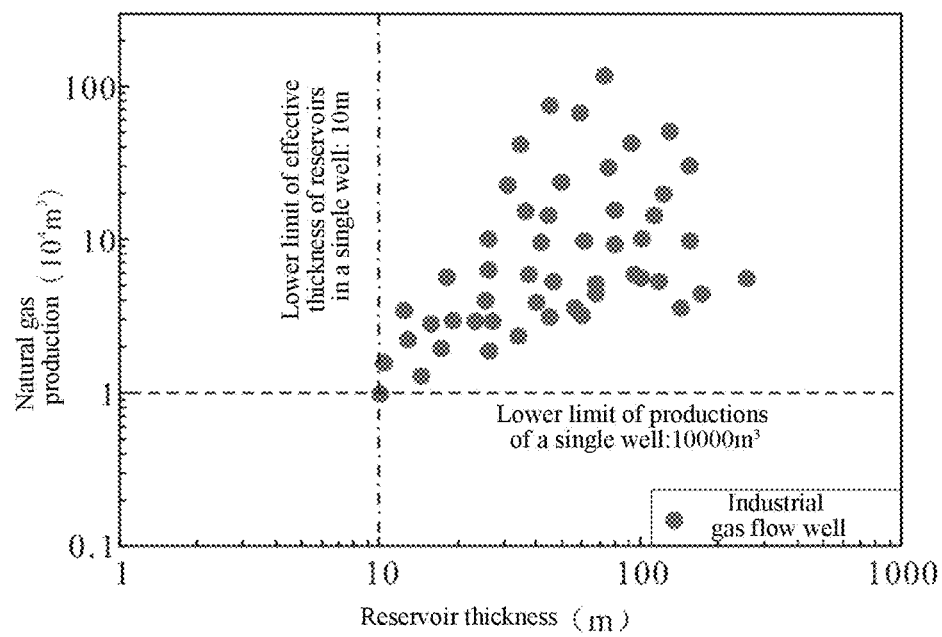
FIG. 11 is a characteristic diagram of an effective reservoir thickness threshold (lower limit) of an effective trap of natural gas according to one implementation of the present application.

In an implementation, a reservoir thickness corresponding to the minimum porosity for forming a reservoir having industrial gas flow is obtained as 10 m according to the minimum reservoir thickness of 360 exploited gas fields, that is, the threshold of effective reservoir thickness is 10 m, referring to FIG. 11. In one example, an average value of the effective reservoir thickness of the trap is 94.2 m, which is larger than the threshold of the effective reservoir thickness of 10 m, and for the effective reservoir thickness of the evaluated trap, the trap is effective. In this implementation, the threshold of the passage system is obtained as 0.1 according to that the passage system is 0.1 when there is no effective passage system.

In this implementation, the distance parameter is 0.1 when the evaluated trap is within the boundary of the farthest petroleum migration range, and the distance parameter is 0 when the evaluated trap is outside of the boundary of the farthest petroleum migration range; accordingly, the threshold of the distance to the hydrocarbon generation center is 0.1.

In one implementation, the geological parameters are matched with thresholds in each of the designated dimensions, respectively, according to the following function, to obtain the characterization value of each of the designated dimensions:

$$W_S = 1 - e^{a_S \times S_{min\_p}}$$

where $W_S$ is the characterization value, which is within a range of 0~1; $a_S$ is a variable coefficient, related to the threshold of a key parameter in the geological structure; $S_{min\_P}$ is a contribution value of a geological parameter in the geological structure and a threshold to the probability for forming a reservoir, the $S_{min\_P}$ is satisfied with $S_{min\_P} = S_{lim\_p} \cdot S/S_{lim}$. S is a value of a geological parameter in a corresponding dimension in the geological structure, $S_{lim}$ is a threshold in the dimension corresponding to the characterization value in the geological structure. Specifically, in an example implementation of evaluating trap effectiveness, $S_{min\_P}$ is a contribution value of a trap parameter in the geological structure and a threshold to the probability for forming a reservoir, the $S_{min\_P}$ is satisfied with $S_{min\_P} = S_{lim\_p} \cdot S/S_{lim}$, S is a value of a trap parameter in a corresponding dimension, $S_{lim}$ is a threshold in a dimension corresponding to the characterization value.

In an implementation, the variable coefficient $a_S$ may be obtained according to the following function:

$$a_S = a_{S\_50\%} + \frac{(a_{S\_90\%} - a_{S\_50\%})}{(S_{mid\_P} - S_{lim\_P})} \times (S_{min\_P} - S_{lim\_P})$$

where $S_{lim\_P}$ is the probability for forming a reservoir by controlling geological resources by a threshold, and a corresponding characterization value is $W_{S\_50\%}$; $S_{mid\_P}$ is the probability for forming a reservoir by controlling geological resources by a median that is the value of trap parameter when $W_S$ is equal to 0.9, and a corresponding characterization value is $W_{S\_90\%}$; $a_{S\_50\%}$ is a variable coefficient $a_S$ when the trap parameter is equal to the threshold, $a_{S\_90\%}$ is a variable coefficient $a_S$ when the trap parameter is equal to the median; the $a_{S\_50\%}$ is satisfied with $a_{S\_50\%}=[\ln(1-W_{S\_50\%})]/S_{lim\_P}$, and the $a_{S\_90\%}$ is satisfied with $a_{S\_90\%}=[\ln(1-W_{S\_90\%})]/S_{mid\_P}$. Specifically, in an example implementation of evaluating trap effectiveness, $S_{lim\_P}$ is the probability for forming a reservoir by controlling petroleum by a threshold, and a corresponding characterization value is $W_{S\_50\%}$; $S_{mid\_P}$ is the probability for forming the reservoir by controlling petroleum by a median, and a corresponding characterization value is $W_{S\_90\%}$; $a_{S\_50\%}$ is a variable coefficient $a_S$ when the trap parameter is equal to the threshold, $a_{S\_90\%}$ is a variable coefficient $a_S$ when the trap parameter is equal to the median; the $a_{S\_50\%}$ is satisfied with $a_{S\_50\%}=[\ln(1-W_{S\_50\%})]/S_{lim\_P}$, and the $a_{S\_90\%}$ is satisfied with $a_{S\_90\%}=[\ln(1-W_{S\_90\%})]/S_{mid\_P}$.

The above described implementation can be an example for a scenario of evaluating trap effectiveness. It can be known from analysis on trap parameters of a large number of the exploited petroleum reservoirs that, when each of the trap parameters is a threshold of corresponding parameters for forming an industrial petroleum reservoir, the probability that the trap can form an industrial petroleum reservoir is about 50%; and when each of the trap parameters is a median of corresponding parameters for forming an industrial petroleum reservoir, the probability that the trap can form an industrial petroleum reservoir is about 90%. Specifically, the probability for forming a reservoir by controlling petroleum by the threshold in a dimension is 50%, i.e., $S_{lim\_P}=0.5$, the characterization value is 0.5 when the trap parameter value in the dimension is equal to the threshold in the dimension, i.e., $W_{S\_50\%}=0.5$; when the probability for forming a reservoir by controlling petroleum by the median of the trap parameters in an industrial petroleum reservoir is 90%, i.e., $S_{mid\_P}=0.9$, the characterization value is 0.9 when the trap parameter in the dimension is equal to the median, i.e., $W_{S\_90\%}=0.9$; variable coefficients corresponding to the threshold and the median are $a_{S\_50\%}$ and $a_{S\_90\%}$, respectively.

Figure 12:
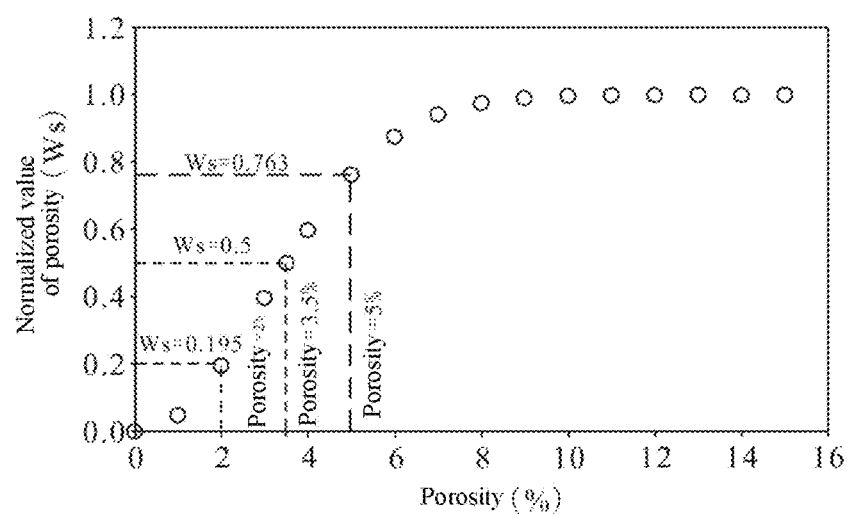
FIG. 12 is a characteristic diagram of normalized and quantized data of porosity of a target stratum according to one implementation of the present application.

Hereinafter, $$W_S = 1 - e^{a_S \times S_{min\_P}}$$

is described in detail in combination with FIG. 12. In one implementation, a porosity threshold is 3.5%, when the trap parameter of porosity is the porosity threshold of a reservoir in an industrial gas flow interval that is obtained as 3.5%, the corresponding characterization value is 0.5; when the porosity is 2%, the corresponding characterization value is 0.195; and when the porosity is 5%, the corresponding characterization value is 0.763. It can be seen that the characterization value of porosity enlarges the difference around the obtained porosity threshold of a reservoir in an industrial gas flow interval, thereby improving sensitivity. The precision of a trap forming reservoir parameter around the threshold can be enlarged effectively by the method $W_S$, which greatly improves the accuracy of trap evaluation. Specifically, when the trap parameter is around the threshold, the obtained characterization value corresponding to the dimension changes greatly as long as the trap parameter fluctuates slightly, that is, the slope of characterization value is relatively large when the trap parameter is around the threshold. The contribution of the threshold to the trap effectiveness is taken into full consideration.

In an implementation, an evaluation operation is performed based on the following function to obtain an evaluation value of a geological resource in the geological structure:

$$Z_s = \left( \prod_{i=1}^{n} W_{s\_i} \right)^{1/n}$$

wherein $Z_s$ is an evaluation value of exploitation value of a geological resource; $W_{s\_i}$ is a characterization value in the ith dimension; n is number of dimensions. Specifically, in the scene of evaluating trap effectiveness, $Z_s$ is an evaluation value of a trap; $W_{s\_i}$ is a characterization value in the ith dimension; n is number of dimensions.

In this implementation, the evaluation value $Z_s$ is 0~1, the larger the value is, the larger the indicated probability for exploitable value of the geological resource is; in contrast, the smaller the indicated probability for exploitable value of the geological resource is. Specifically, when $Z_s$ is larger than or equal to 0.5, the geological resource has exploitation value. Specifically, in the setting of evaluating trap effectiveness, the evaluation value $Z_s$ is 0~1, the larger the value is, the larger the indicated probability of the trap effectiveness is; in contrast, the smaller the indicated probability of the trap effectiveness is. Specifically, when $Z_s$ is larger than or equal to 0.5, the trap is effective.

Evaluation on exploitation value of the geological resource may also be performed in the following manner: when the geological parameter is smaller than the corresponding threshold, the geological resource does not have an exploitation value.

Figure 13:
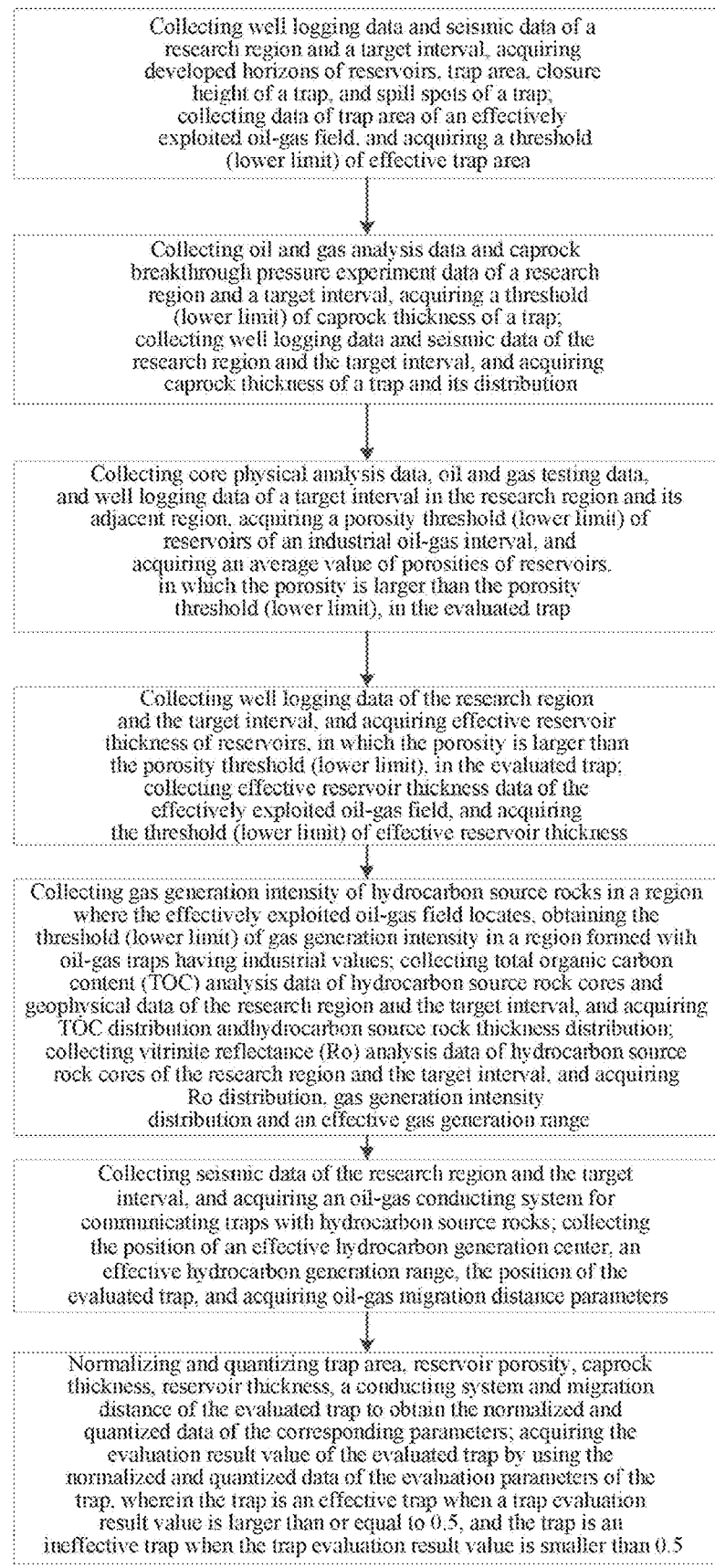
FIG. 13 is a schematic diagram for evaluating effectiveness of a petroleum trap according to one implementation of the present application.

Hereinafter, a specific example implementation is explained in detail with reference to the illustration of FIG. 13. A method for evaluating exploitation value of a geological resource provided by an implementation may be implemented by software operating on an electronic device. Geological resources at a certain geographic location can be evaluated by using a method for evaluating exploitation value of a geological resource to provide work basses.

In the example, the geological resource may be petroleum, and the geological structure may be a trap. The geological parameters of the geological structure in multiple designated dimensions are acquired; for example, in trap effectiveness evaluation, parameters of trap area, cap-rock thickness, porosity parameter, effective reservoir thickness, a passage system, and distance to a hydrocarbon generation center are acquired. The geological parameters may be obtained by an experiment, may also be acquired from logging data and the like; or may be obtained by an external storage device, network transmission and input of an input device or the like.

The evaluation on exploitation value of the geological resource according to this example implementation is specifically a method for evaluating the trap effectiveness. The evaluation method includes: collecting logging data and seismic data of a research region and a target interval, acquiring developed horizons of a reservoir, trap area, closure height of a trap, and spill spots of a trap; collecting data of trap area of an effectively exploited petroleum field, and acquiring a threshold (lower limit) of the effective trap area, collecting petroleum analysis data and cap-rock breakthrough pressure experiment data of a research region and a target interval, and acquiring a threshold (lower limit) of cap-rock thickness of a trap; collecting logging data and seismic data of the research region and the target interval, and acquiring cap-rock thickness of a trap and its distribution; collecting core physical analysis data, petroleum testing data, and logging data of target intervals in the research region and its adjacent region, acquiring a porosity threshold (lower limit) of reservoirs of an industrial petroleum interval, acquiring an average value of porosities of reservoirs, in which the porosity is larger than the porosity threshold (lower limit), in the evaluated trap; collecting logging data of the research region and the target interval, and acquiring effective reservoir thickness of reservoirs, in which the porosity is larger than the porosity threshold (lower limit), in the evaluated trap; collecting effective reservoir thickness data of the effectively exploited petroleum field, and acquiring the threshold (lower limit) of effective reservoir thickness; collecting gas generation intensity of hydrocarbon source rocks in a region where the effectively exploited petroleum field locates and obtaining the threshold (lower limit) of gas generation intensity in a region formed with petroleum traps having industrial values; collecting total organic carbon content (TOC) analysis data of hydrocarbon source rock cores and geophysical data of the research region and the target interval, and acquiring TOC distribution and hydrocarbon source rock thickness distribution; collecting vitrinite reflectance (Ro) analysis data of hydrocarbon source rock cores of the research region and the target interval, and acquiring Ro distribution, gas generation intensity distribution and an effective gas generation range; collecting seismic data of the research region and the target interval, and acquiring a petroleum passage system for communicating a trap with a hydrocarbon source rock; and collecting the position of an effective hydrocarbon generation center, an effective hydrocarbon generation range, the position of the evaluated trap of a target stratum of the research region, and acquiring petroleum migration distance parameters.

In this example implementation, the geological parameters are matched with a threshold in each of the designated dimensions, respectively, to obtain the characterization value of each of the designated dimensions, where the threshold is used for representing the minimum value of geological parameters in the designated dimension corresponding to the valuable geological resource, the valuable geological resource corresponding to the minimum value of the geological parameters belongs to the same sort as the geological resource and has been exploited; the threshold may be obtained by an experiment, and may also be obtained by historical data. Matching the geological parameter with the corresponding threshold includes: matching the geological parameter in corresponding dimension with the threshold, obtaining a characterization value in the dimension by calculating for evaluating the dimension, which embodies the function of the threshold in this dimension and the function of the geological parameters. For example, a value obtained by dividing the geological parameter by the threshold is also an acquiring manner for the characterization value, which may be preferably obtained by the following function $$W_S = 1 - e^{a_S \times S_{min\_p}}.$$

By using the operational rule, when the geological parameter changes around the threshold, the slope of the function is relative large, so it can embody the role of Buckets effect of the threshold. Calculation can be performed by instructions preset in an electronic device or the like. The geological parameters in different dimensions are matched with the threshold to obtain corresponding characterization values, and characterization values in different dimensions form a characterization vector for representing the geological structure of the region. Specifically, trap area, reservoir porosity, cap-rock thickness, reservoir thickness, a passage system and migration distance of the evaluated trap are normalized and quantized, to acquire characterization values of corresponding parameters to form a characterization vector.

In this example, an evaluation operation is performed based on the characterization vector to obtain an evaluation value of the geological resource in the geological structure. Specifically, the evaluation value of exploitation value of the geological resource may be determined according to the following function:

$$Z_s = \left( \prod_{i=1}^{n} W_{s\_i} \right)^{1/n}$$

wherein, $Z_s$ is an evaluation value of exploitation value of a geological resource; $W_{s\_i}$ is a characterization value in the ith dimension; n is number of dimensions. The trap is an effective trap when a trap evaluation result value is larger than or equal to 0.5, and the trap is an ineffective trap when the trap evaluation result value is smaller than 0.5. Specific description is given as below in combination with Table 1. The threshold of the trap area is 5 km², the threshold of the cap-rock thickness is 0.45 m, the threshold of the porosity is 3.5%, the threshold of the effective reservoir thickness is 10 m, the threshold of the passage system is 0.1, and the threshold of the distance to a hydrocarbon generation center is 0.1. A trap parameter of trap area is 62.4 km², a trap parameter of cap-rock thickness is 400 m, a trap parameter of porosity is 6.6%, a trap parameter of effective reservoir thickness is 94.2 m, a trap parameter of a passage system is 0.9, and a trap parameter of distance to a hydrocarbon generation center is 0.9. Based on $$W_S = 1 - e^{a_S \times S_{min\_p}},$$

the characterization value of the trap area is obtained as 1, the characterization value of the cap-rock thickness is 1, the characterization value of the porosity is 0.920, the characterization value of the effective reservoir thickness is 1, the characterization value of the passage system is 1, and the characterization value of the distance to a hydrocarbon generation center is 1. Based on the function $$Z_s = \left(\prod_{i=1}^{n} W_{s\_i}\right)^{1/n},$$

the trap evaluation value $Z_s$ is obtained as about 0.983. $Z_s$ is larger than or equal to 0.5, the trap is effective, and the value of the trap $Z_s$ is 0~1, and the larger the $Z_s$ is, the larger the probability that the trap is an effective trap is.

In a similar way, the method for evaluating exploitation value of a geological resource in accordance with one implementation of the present application may be applied in evaluating exploitation value of coal and mine resources. In one implementation, multiple dimension parameters of exploitation value of the coal and mine resources are acquired. The parameters include geological parameters and thresholds. The dimensions include multiple dimension parameters such as dip angle of coal seam, thickness of coal seam, coal seam range, depth of coal seam or the like, and a method for determining the evaluation value and a method for determining an evaluation value of trap effectiveness are not repeated here. When the geological resource is a metallic mineral, the multiple dimensions can include size, height, exploitation depth or the like of a mineral deposit. The method for determining the evaluation value and the method for determining an evaluation value of trap effectiveness are not repeated here.

Figure 14:
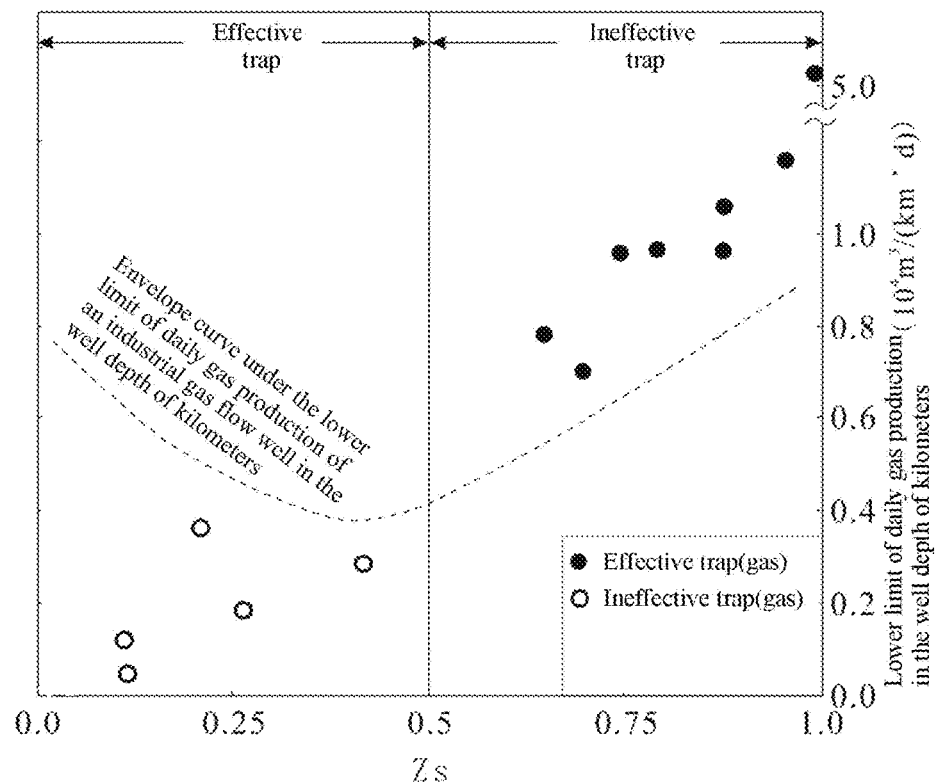
FIG. 14 is an effect graph for evaluating effectiveness of a trap according to one implementation of the present application.

Certain beneficial effects of certain implementations are described below in combination with FIG. 14. Thirteen (13) traps of the discovered industrial gas reservoirs are evaluated by using the disclosure, where 8 traps of industrial gas reservoirs are drilled, and 5 traps do not have industrial value, and coincidence rate of trap evaluation result is good.

In one implementation, an apparatus for evaluating exploitation value of a geological resource is described as follows. Because the principle for solving problems of the apparatus for evaluating exploitation value of a geological resource is similar to that of the method for evaluating exploitation value of a geological resource, the implementation of the apparatus for evaluating exploitation value of a geological resource can refer to the implementation of method for evaluating exploitation value of a geological resource, and the repetitions are not described. As used below, the term "unit" or "module" may be a combination of software and/or hardware for realizing predetermined functions. Although the apparatus described in the following implementation can be implemented by software, implementation by hardware or the combination of software and hardware is also within the scope of the present application. The apparatus may specifically include: an acquisition unit, a matching unit, and an evaluation unit. The structure is described in detail as below.

The acquisition unit is used for acquiring geological parameters of the geological structure in multiple designated dimensions, where the geological parameters are used for characterizing a state of the geological structure in the designated dimensions.

The matching unit is used for matching the geological parameters with a threshold of each of the designated dimensions, respectively, to obtain a characterization value of each of the designated dimensions; and forming a characterization vector by the characterization values of the multiple designated dimensions, where the threshold is used for representing the minimum value of a geological parameter in the designated dimension corresponding to an exploited valuable geological resource that belongs to the same sort as the geological resource.

In this implementation, the characterization value refers to a contribution value of the geological parameter to the exploitation value of the geological resource in each dimension. Specifically, in an implementation for evaluating trap effectiveness, the characterization value refers to a contribution value of the trap parameter in forming industrial petroleum reservoir in each of the dimensions. Data in different dimensions is unified into a non-dimensional parameter by the characterization values, the characterization values corresponding to different dimensions have the same weight, and help to perform overall operation to obtain evaluation value of a trap after being normalized and quantized. The evaluation unit is used for performing an evaluation operation based on the characterization vector to obtain an evaluation value of the geological resource in the geological structure.

In an implementation, the multiple dimensions include porosity, trap area, cap-rock thickness, effective reservoir thickness, a passage system, and distance to a hydrocarbon generation center. The multiple dimensions are related to the trap effectiveness. Among other benefits, the defects of insufficient consideration of dimensions of the effective trap and insufficient consideration of the threshold are overcome by taking trap parameters and thresholds in at least six dimensions into consideration.

The threshold refers to a threshold of a controlling factor parameter having exploitation value of the geological resource. Specifically, in the setting of evaluating trap effectiveness, the threshold refers to a threshold of a controlling factor parameter of a trap having industrial value. When a value of a trap parameter of the evaluated trap is lower than corresponding threshold, the trap cannot obtain industrial petroleum flow, and only when all of the controlling factor parameters of the trap are higher than the corresponding threshold, the trap is an effective trap. Specifically, the threshold includes a porosity threshold, a trap area threshold, a cap-rock thickness threshold, an effective reservoir thickness threshold, a passage system threshold, and a threshold of distance to a hydrocarbon generation center corresponding to the trap parameters.

In an implementation, the geological parameters are respectively matched with the threshold in each of the designated dimensions according to the following function, to obtain the characterization value of each of the designated dimensions.

$$W_S = 1 - e^{a_S \times S_{min\_p}}$$

Where $W_S$ is the characterization value, which is within a range of 0~1; $a_S$ is a variable coefficient, related to a threshold of the key parameter in the geological structure; $S_{min\_P}$ is a contribution value of the geological parameter and the threshold to the probability for forming the reservoir, the $S_{min\_P}$ is satisfied with $S_{min\_P} = S_{lim\_p} \cdot S/S_{lim}$. S is a geological parameter value in a corresponding dimension, $S_{lim}$ is a threshold in a dimension corresponding to the characterization value. Specifically, in the setting of evaluating trap effectiveness, $S_{lim\_P}$ is a contribution value of the trap parameter and the threshold to the probability for forming the reservoir, the $S_{min\_P}$ is satisfied with $S_{min\_P} = S_{lim\_p} \cdot S/S_{lim}$, S is a trap parameter value in a corresponding dimension, $S_{lim}$ is a threshold in a dimension corresponding to the characterization value.

In an implementation, an evaluation operation is performed based on the following function to obtain an evaluation value of the geological resource in the geological structure:

$$Z_s = \left(\prod_{i=1}^{n} W_{s\_i}\right)^{1/n}$$

where $Z_s$ is an evaluation value of exploitation value of a geological resource; $W_{s\_i}$ is a characterization value in the ith dimension; n is number of dimensions. Specifically, in the scene of evaluating trap effectiveness, $Z_s$ is a trap evaluation value; $W_{s\_i}$ is a characterization value in the ith dimension; n is number of dimensions.

Specifically, in an implementation, the evaluation value $Z_s$ is 0~1, the larger the value is, the larger the indicated probability of exploitable value of the geological resource is; in contrast, the smaller the indicated probability of exploitable value of the geological resource exploitable value is. Specifically, when $Z_s$ is larger than or equal to 0.5, the geological resource has exploitation value. Specifically, in the setting of evaluating trap effectiveness, the evaluation value $Z_s$ is 0~1, the larger the value is, the larger the indicated probability of trap effectiveness is; in contrast, the smaller the indicated probability of trap effectiveness is. Specifically, when $Z_s$ is larger than or equal to 0.5, the trap is effective.

Figure 15:
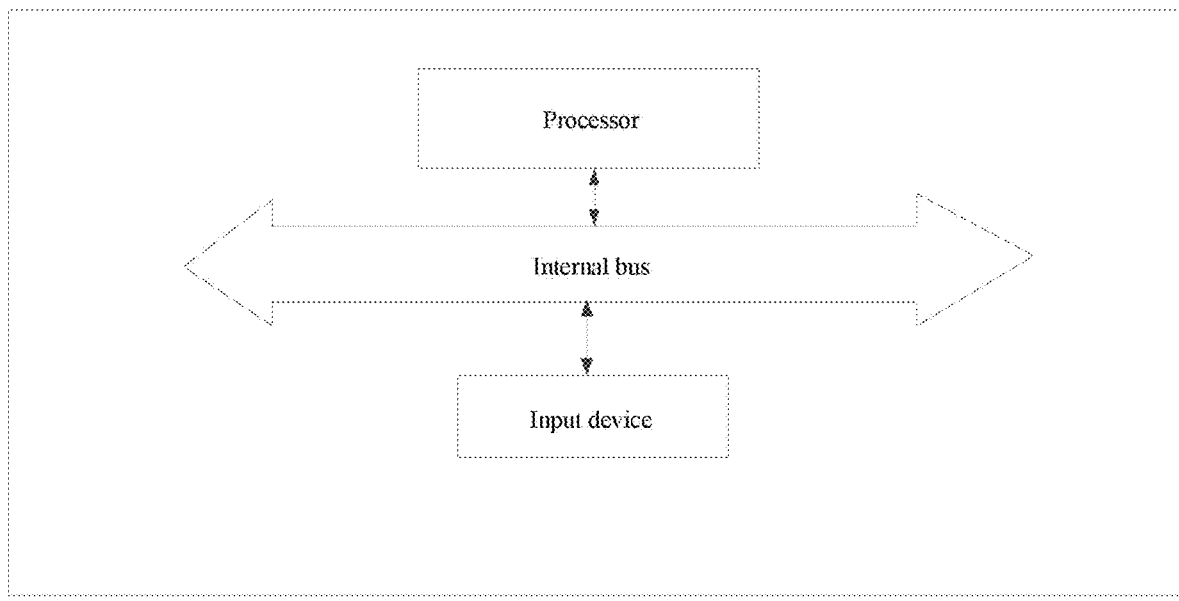
FIG. 15 is a schematic diagram of an electronic device according to one implementation of the present application.

Now referring to FIG. 15, one implementation of the present application also provides an electronic device, including: an input device, and a processor. The input device is used for acquiring geological parameters of the geological structure in multiple designated dimensions, where the geological parameters are used for characterizing a state of the geological structure in the designated dimensions. The processor is used for: matching the geological parameters with a threshold of each of the designated dimensions, respectively, to obtain a characterization value of each of the designated dimensions; forming a characterization vector by the characterization values of the designated dimensions, where the threshold is used for representing the minimum value of geological parameters in the designated dimensions corresponding to a valuable geological resource, the valuable geological resource corresponding to the minimum value of the geological parameters belongs to the same sort as the geological resource and has been exploited; and performing an evaluation operation based on the characterization vector to obtain an evaluation value of the geological resource in the geological structure.

The input device can be one of main apparatuses that perform information exchange between a user and a computer system. The input device can include a keyboard, a mouse, a camera, a scanner, a light pen, a handwriting input board, a voice input device and the like; the input device is used for inputting original data and programs for processing the data into the computer. The input device may also acquire and receive data transmitted from other modules, units or devices.

The processor can be implemented in any suitable manner. For example, the processor may be in forms of e.g., a microprocessor or a processor, and a computer readable medium (such as software or firmware) storing a computer readable program code can be executed by the processor; the processor may also correspond to or include a logic gate, a switch, an application specific integrated circuit (ASIC), a programmable logic controller and an embedded microcontroller and the like. Functions and effects specifically realized by the electronic device can be explained with reference to other implementations and will not be repeated here.

Some implementations according to the present application also provide a non-transitory computer storage medium storing computer program instructions which, when executed by a processor, achieve, e.g., by causing a computer to perform specific functions: acquiring geological parameters of the geological structure in multiple designated dimensions, where the geological parameters are used for characterizing a state of the geological structure in the designated dimensions; matching the geological parameters with a threshold of each of the designated dimensions, respectively, to obtain a characterization value of each of the designated dimensions; forming a characterization vector by the characterization values of the designated dimensions, where the threshold is used for representing the minimum value of the geological parameters in the designated dimensions corresponding to a valuable geological resource, the valuable geological resource corresponding to the minimum value of the geological parameter belongs to the same sort as the geological resource and has been exploited; and performing an evaluation operation based on the characterization vector to obtain an evaluation value of the geological resource in the geological structure.

The memory can include but is not limited to a random access memory (RAM), a read-only memory (ROM), Cache, a hard disk drive (HDD) or a memory card. The memory may be used for storing computer program instructions. A network communication unit may be provided in accordance with the standard prescribed in the communication protocol and serves as an interface for network connection communication. Functions and effects specifically realized by program instructions stored in the computer storage medium can be explained with reference to other implementations and will not be repeated here.

Essential characteristics of an evaluation on exploitation value of a geological resource provided some implementations of the present application are that, in consideration of multiple dimensions related to the geological resource and in sufficient consideration of influence on exploitation value of the geological resource by the threshold, geological parameters in the multiple dimensions are unified and quantified, a quantitative evaluation standard of exploitation value of the geological resource is made, and a method for evaluating exploitation value of the geological resource, in particular, a new method for quantificational evaluating trap effectiveness, is provided.

Although the present application discloses and describes, in accordance with some example implementations, an apparatus, an electronic device or a computer storage medium for evaluating exploitation value of a geological resource, the application is not limited to such implementations. Implementations in which these data acquisition, processing, outputting, judging manners and the like after being modified or varied are applied can still fall within the scope of the present application.

Although the present application provides operation steps of methods in accordance with some implementations as described and shown in the Figures (e.g., flow charts), more or less operation steps can be included without departing from the scope of the present application. The order of steps listed in the example implementations presented disclose various execution orders of the steps, but are not limiting to this execution order. In the actual execution of a device or client product, it is practicable to perform sequential execution or parallel execution according to the methods shown in certain implementations or the drawings (such as a parallel processor or an environment of multithread processing, or even a distributed data processing environment).

The terms "include", "contain" or any other variants thereof intend to cover non-exclusive including, so as to make processes, methods, products or devices including a series of elements not only include those elements but also include other elements that are not clearly listed, or further include elements that are inherent to the processes, methods, products or devices. Without more limitation, it is not exclusive that there are additional same or equivalent elements in the processes, methods, products or devices including the elements.

The apparatuses, modules or the like illustrated in the above implementations can be specifically implemented by a computer chip or an entity, or by a product having a certain function. For convenience of description, the above devices are described by being divided into various modules by functions. The functions of the modules can be realized in the same one or multiple software and/or hardware, or the module for realizing the same one function can be achieved by the combination of multiple sub modules or the like. The above-described implementations are illustrative; for example, the division of the modules is a logically functional division, and there may be other division manners in actual implementation, for example, multiple modules or components that can be combined or integrated into another system, or some features can be omitted or not executed.

Further, except that a controller is realized purely by ways of computer readable program codes, it is possible that the controller realizes the same functions in forms of a logic gate, a switch, an application-specific integrated circuit, a programmable logic controller and an embedded microcontroller and the like by logically programming the method steps in accordance with various implementations of methods set forth herein. Therefore, such a controller can be regarded as a hardware component, and devices therein for realizing various functions can also be regarded as structures within the hardware component. Or, the devices for realizing various functions can be regarded as software modules for implementing the method or as structures within the hardware component.

The present application can be described in general context of computer executable instructions executed by a computer, such as programming modules. Generally, the programming modules include routines, programs, objects, components, data structures, classes or the like that execute particular tasks or realize particular abstract data types. The present application can also be practiced in distributed computing environments in which tasks are executed by remote processing devices that are connected through communication network. In distributed computing environments, the programming modules may be in local and remote computer storage mediums including a storage device.

Implementations in the present application can be implemented by means of software in combination with necessary general hardware platform. Accordingly, the substantive technical solution can be embodied in the form of software products, the computer software products can be stored in a storage media, such as ROM/RAM, a disc, an optical disc or, including several instructions to make a computer device (which can be a personal computer, a mobile terminal, a server or a network device or the like) execute the method described in the implementations or some parts of the implementations of the present application. Computer storage media as used herein does not include transitory signals.

Some implementations in the present application are described in a progressive manner, with the same or similar parts in the implementations being for reference to each other, and each implementation focuses on differences from other implementations. Implementations according to certain aspects of the present application can be applied in numerous general or specialized computer system environments or configurations, such as a personal computer, a server computer, a handheld device or a portable device, a tablet device, a multi-processor system, a microprocessor-based system, a set-top box, a programmable electronic device, a network PC, a small-size computer, a large-scale computer, distributed computing environment including any of the above-described systems or devices, and the like.

Although the present application is described with certain specific example implementations above, it should be appreciated by those skilled in the art that the present application may have many variations and changes without departing from the spirit of the present application as described in the description above and as set forth in the appended claims.

What is claimed is:

1. A method for evaluating exploitation value of a geological resource performed by an electronic device including an input device and a processor, comprising: inputting, by the input device, acquired geological parameters of a geological structure in multiple designated dimensions, wherein the geological parameters represent a state of the geological structure in the designated dimensions; matching, by the processor, the geological parameters with a threshold of each of the designated dimensions, respectively, to obtain a characterization value of each of the designated dimensions; forming, by the processor, a characterization vector from the characterization values of the designated dimensions, wherein the threshold represents a minimum value of the geological parameters in the designated dimensions corresponding to a geological resource having exploitation value under existing economic and technical conditions, wherein the geological resource corresponding to the minimum value of the geological parameters belongs to the same sort as the geological resource and has been exploited; and performing, by the processor, an evaluation operation based on the characterization vector to obtain an evaluation value of the geological resource in the geological structure; determining whether the obtained evaluation value is greater than or equal to a predetermined threshold evaluation value; and responsive to determining that the obtained evaluation value is greater than or equal to the predetermined threshold evaluation value, identifying the geological structure as a geological structure to be exploited and determining to form a reservoir in the geological structure by controlling geological resources, wherein the multiple designated dimensions include trap area, cap-rock thickness, porosity, effective reservoir thickness, a passage system parameter, and a location parameter of distance to a hydrocarbon generation center from an evaluated trap, and wherein a threshold of the trap area is 5 km2, a threshold of the cap-rock thickness is 0.45 m, a threshold of the porosity is 3.5%, a threshold of the effective reservoir thickness is 10 m, a Page 3 of 12 threshold of the passage system parameter is 0.1, and a threshold of the location parameter of the distance to the hydrocarbon generation center from the evaluated trap is 0.1.

2. The method according to claim 1, wherein a geological parameter of the distance to the hydrocarbon generation center is obtained according to the following function:

$$L = 0.1 + 0.8 \times \frac{L_{max} - L_S}{L_{max}}$$

wherein L is petroleum migration distance parameter of the evaluated trap, in the unit of km; $L_S$ is distance from the evaluated trap to the boundary of an effective hydrocarbon generation range, in the unit of km; and $L_{max}$ is distance from the boundary of an effective hydrocarbon generation center to the boundary of the farthest petroleum migration range, in the unit of km.

3. A method for evaluating exploitation value of a geological resource performed by an electronic device including an input device and a processor, comprising: inputting, by the input device, acquired geological parameters of a geological structure in multiple designated dimensions, wherein the geological parameters represent a state of the geological structure in the designated dimensions; matching, by the processor, the geological parameters with a threshold of each of the designated dimensions, respectively, to obtain a characterization value of each of the designated dimensions; forming, by the processor, a characterization vector from the characterization values of the designated dimensions, wherein the threshold represents a minimum value of the geological parameters in the designated dimensions corresponding to a geological resource having exploitation value under existing economic and technical conditions, wherein the geological resource corresponding to the minimum value of the geological parameters belongs to the same sort as the geological resource and has been exploited; performing, by the processor, an evaluation operation based on the characterization vector to obtain an evaluation value of the geological resource in the geological structure; determining whether the obtained evaluation value is greater than or equal to a predetermined threshold evaluation value; and responsive to determining that the obtained evaluation value is greater than or equal to the predetermined threshold evaluation value, identifying the geological structure as a geological structure to be exploited and determining to form a reservoir in the geological structure by controlling geological resources, wherein the geological parameters are matched respectively with a threshold of each of the designated dimensions according to the following function: wherein W is the characterization value; as is a variable coefficient; Sm P is a contribution value of a value of geological parameter to the probability for forming a reservoir in any designated dimension, the SmmP is satisfied with Smn_P=Slim p S/Slm, S is a value of a geological parameter in the designated dimension, Slm is a threshold in the designated dimension, and SlimP is the probability for forming a reservoir by controlling geological resources by the threshold.

4. The method according to claim 3, wherein the variable coefficient $a_S$ is obtained according to the following function:

$$a_S = a_{S\_50\%} + \frac{(a_{S\_90\%} - a_{S\_50\%})}{(S_{mid\_P} - S_{lim\_P})} \times (S_{min\_P} - S_{lim\_P})$$

wherein $S_{min\_P}$ is a contribution value of a value of geological parameter to the probability for forming a reservoir in any designated dimension; $S_{lim\_P}$ is the probability for forming a reservoir by the controlling of the threshold, and a corresponding characterization value is $W_{S\_50\%}$; $S_{mid\_P}$ is the probability for forming a reservoir by controlling geological resources by a median, and a corresponding characterization value is $W_{S\_90\%}$; $a_{S\_50\%}$ is a variable coefficient $a_S$ when the trap parameter is equal to the threshold, $a_{S\_90}\%$ is a variable coefficient $a_S$ when the trap parameter is equal to the median; the $a_{S\_50\%}$ is satisfied with $a_{S\_50\%}=[\ln(1-W_{S\_50\%})]/S_{lim\_P}$, and the $a_{S\_90\%}$ is satisfied with $a_{S\_90\%}=[\ln(1-W_{S\_90\%})]/S_{mid\_P}$.

5. The method according to claim 4, wherein an evaluation value of exploitation value of the geological resource is determined according to the following function:

$$Z_s = \left(\prod_{i=1}^{n} W_{s\_i}\right)^{1/n}$$

wherein $Z_s$ is the evaluation value of exploitation value of the geological resource; $W_{s\_i}$ is a characterization value in the ith dimension; and n is number of dimensions.

6. An electronic device, comprising: an input device configured to input acquired geological parameters of a geological structure in multiple designated dimensions, wherein the geological parameters represent a state of the geological structure in the designated dimensions; and a processor configured to: match the geological parameters with a threshold of each of the designated dimensions, respectively, to obtain a characterization value of each of the designated dimensions; form a characterization vector from the characterization values of the designated dimensions, wherein the threshold represents a minimum value of the geological parameters in the designated dimensions corresponding to a geological resource having exploitation value under existing economic and technical conditions; and perform an evaluation operation based on the characterization vector to obtain an evaluation value of the geological resource in the geological structure, wherein the evaluation value of exploitation value of the geological resource is determined according to the following function: wherein ZS is the evaluation value of exploitation value of the geological resource, W_ is a characterization value in the ith dimension, and n is number of dimensions; determine whether ZS is greater than or equal to 0.5; and responsive to determining that ZS is greater than or equal to 0.5, identify the geological structure as a geological structure to be exploited and determine to form a reservoir in the geological structure by controlling geological resources.

7. A non-transitory computer storage medium storing computer program instructions which, when executed by a processor, cause a computer to perform functions including: acquiring geological parameters of a geological structure in multiple designated dimensions, wherein the geological parameters represent a state of the geological structure in the designated dimensions; matching the geological parameters with a threshold of each of the designated dimensions, respectively, to obtain a characterization value of each of the designated dimensions; forming a characterization vector from the characterization values of the designated dimensions, wherein the threshold represents a minimum value of the geological parameters in the designated dimensions corresponding to a geological resource having exploitation value under existing economic and technical conditions; and performing an evaluation operation based on the characterization vector to obtain an evaluation value of the geological resource in the geological structure, wherein the evaluation value of exploitation value of the geological resource is determined according to the following function: wherein ZS is the evaluation value of exploitation value of the geological resource, WS is a characterization value in the ith dimension, and n is number of dimensions; determining whether ZS is greater than or equal to 0.5; and responsive to determining that ZS is greater than or equal to 0.5, identifying the geological structure as a geological structure to be exploited and determining to form a reservoir in the geological structure by controlling geological resources.

* * * * *